(12) United States Patent
Takemoto

(10) Patent No.: US 7,605,850 B2
(45) Date of Patent: Oct. 20, 2009

(54) IMAGE PROCESSING APPARATUS, METHOD AND PROGRAM FOR VERIFYING A SETTING OF AN IMAGE PROCESSING MODE

(75) Inventor: Fumito Takemoto, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 738 days.

(21) Appl. No.: 10/917,393

(22) Filed: Aug. 13, 2004

(65) Prior Publication Data

US 2005/0036035 A1    Feb. 17, 2005

(30) Foreign Application Priority Data

Aug. 15, 2003    (JP)    ............... 2003-293793

(51) Int. Cl.
    H04N 5/76    (2006.01)
(52) U.S. Cl. .................. 348/231.6; 348/222.1
(58) Field of Classification Search ............ 348/231.99, 348/231.1–231.9, 333.12, 333.11, 333.04, 348/333.02, 333.1, 207.1, 207.11, 207.2, 348/222.1, 223.1, 231.3, 231.6
    See application file for complete search history.

(56) References Cited

U.S. PATENT DOCUMENTS

| | | | |
|---|---|---|---|
| 5,579,048 A * | 11/1996 | Hirasawa | ............... 348/333.02 |
| 6,011,547 A | 1/2000 | Shiota et al. | |
| 6,650,365 B1 * | 11/2003 | Sato | ............... 348/231.3 |
| 7,145,597 B1 * | 12/2006 | Kinjo | ............... 348/222.1 |
| 2001/0041005 A1 * | 11/2001 | Fujiwara | ............... 382/181 |
| 2003/0146978 A1 * | 8/2003 | Toyoda | ............... 348/207.2 |
| 2003/0197879 A1 | 10/2003 | Terashita | |

FOREIGN PATENT DOCUMENTS

| | | | |
|---|---|---|---|
| JP | 2000354255 A | * | 12/2000 |
| JP | 2004-153683 A | | 5/2004 |

* cited by examiner

Primary Examiner—Lin Ye
Assistant Examiner—Nelson D. Hernández Hernández
(74) Attorney, Agent, or Firm—Sughrue Mion, PLLC

(57) ABSTRACT

An image output device judges whether an image processing mode of a first image data set and an image processing mode of a second image data set obtained immediately before the first image data set are the same. If the judgment is YES, the image output device obtains a frequency of photography during obtainment of the first image data set and a time interval between photography of the first image data set and the second image data set. Then, the image output device judges whether a relationship between the frequency and the time interval of photography satisfies a predetermined relationship. If the judgment is NO, the image output device judges that the image processing mode has not been intentionally set. Then, the image output device undoes the image processing, which has already been performed on the first image data set at a digital camera, and performs regular image processing.

23 Claims, 5 Drawing Sheets

IMAGE PROCESSING APPARATUS, METHOD AND PROGRAM FOR VERIFYING A SETTING OF AN IMAGE PROCESSING MODE

BACKGROUND OF THE INVENTION

1. Field of the Invention

The present invention relates to an image processing apparatus and an image processing method for performing further image processing on an image data set which was obtained with a photography device such as a digital camera, having a function of performing image processing on an image data set. The further image processing is performed on the image data set on which image processing has already been performed and to which image processing information about the performed image processing has been attached. The present invention also relates to a program for causing a computer to execute the image processing method.

2. Description of the Related Art

In digital cameras, images obtained by photography may be recorded as digital image data sets in recording media, such as internal memories in the digital cameras, and IC cards. The images obtained by photography may be reproduced by printers or monitors based on the recorded digital image data sets. When the images obtained with the digital cameras are reproduced, there is expectation that high quality images similar to prints reproduced from negative films will be reproduced.

When prints are obtained from the digital image data sets as described above, the image quality of the prints may be improved by performing various kinds of image processing on the image data sets, such as exposure correction processing, white balance adjustment processing, gradation correction processing, color correction processing and sharpness processing. A method for obtaining prints having higher image quality has been proposed, wherein image data sets which were obtained with digital cameras and to which photography information such as with/without flash and a type of lighting has been attached are output, and wherein when image processing is performed, the image processing is performed on the image data sets in a more appropriate manner with reference to the photography information attached to the image data sets (U.S. Pat. No. 6,011,547).

Meanwhile, digital cameras have also been proposed, which can output processed image data sets by automatically or manually performing image processing on image data sets obtained by photography. In such digital cameras having image processing functions, image processing is performed on the image data sets so that optimum image quality is attained according to photographed scenes and photography conditions. Further, photographers may intentionally select kinds of image processing which will be performed on the image data sets and various kinds of functions related to the image processing by setting image processing modes. For example, the kinds of image processing such as automatic white balance adjustment processing, white balance adjustment processing in a fixed light source type mode (a tungsten mode, a cloudy sky mode, a shade mode or the like), image quality modification processing (gradation, sharpness and saturation), taste in reproduction images (monochrome, sepia, beautiful skin or the like) and finish setting modes (a night view/fireworks mode, a portrait mode, a landscape/distant view mode, a macro/close-up mode, an underwater photography mode, a user exposure correction mode or the like) maybe selected. Further, the various kinds of functions related to image processing, such as an automatic bracket function, photography using an optical filter, soft-focus photography, interval photography, continuous shooting, multiple exposure, synthesis with a template and synthesis with a frame may be selected. Accordingly, optimum image processing may be performed according to the image processing mode so that photographers' intentions may be reflected in the image processing. If the shade mode has been set as the fixed light source type mode, image processing is performed on an image data set obtained by photography so that an RGB gain of the image data set is adjusted toward a YR (namely, orange) direction.

When image data sets obtained with digital cameras having image processing functions as described above are reproduced on printers or monitors, further image processing is performed on the image data sets. However, if the further image processing is performed on the image data sets on which image processing has already been performed, reproduced images might not have the image quality intended for at the digital cameras or at the reproduction devices. Therefore, a method has been proposed, wherein image processing is performed on image data sets based on image processing information indicating image processing modes, attached to the image data sets, in considering image processing related to the image processing information, which has already been performed on the image data sets (U.S. patent Laid-Open No. 20030197879). In this method, image processing which has already been performed on the image data sets is considered. Therefore, processed image data sets on which image processing has been performed in an appropriate manner may be obtained.

However, if a user of a digital camera erroneously sets a photography mode, although image processing which was not intended by the user has been performed on the image data set, image processing is performed taking the image processing, which was not intended by the user, into consideration. Therefore, an image having image quality intended by the user may not be reproduced.

For example, if a photograph is taken in outdoor light by setting a tungsten mode, an image represented by an obtained image data set will have a cyan or bluish cast. If a photograph is taken in tungsten light by setting a cloudy sky mode or a shade mode, an image represented by an obtained image data set will have an orange cast. In photography devices of some manufacturers, when a portrait mode is set, a photograph is taken with a shallow depth-of-field by opening an aperture. Further, image processing is performed on the obtained image data set to reduce sharpness and soften gradation. Meanwhile, when a landscape mode is set, a photograph is taken with a deep depth-of-field by closing an aperture. Further, image processing is performed on the obtained image data set to increase sharpness and harden gradation. Therefore, if a landscape is photographed while the device is set in the portrait mode, an image represented by an obtained image data set becomes unsharp. If a person is photographed while the device is set in the landscape mode, sharpness is emphasized too much in an image represented by an obtained image data set and flesh colors become rough.

SUMMARY OF THE INVENTION

In view of the foregoing circumstances, it is an object of the present invention to make it possible to perform image processing on an image data set, which was obtained with a digital camera having an image processing function and on which image processing has already been performed, in an appropriate manner even if a user erroneously set a photography mode during photography.

An image processing apparatus according to the present invention is an image processing apparatus comprising:

a processing means for obtaining a processed image data set by performing further image processing on an image data set on which image processing has been performed according to an image processing mode set at a photography device such as a digital camera and to which supplementary information including image processing information indicating the image processing mode has been attached;

an intention judgment means for judging whether an image processing mode of a processing object image data set has been intentionally set, based on supplementary information of the processing object image data set and supplementary information attached to at least one of image data sets which were obtained before or after photography time of the processing object image data set, wherein the at least one of image data sets includes an image data set obtained immediately before obtainment of the processing object image data set;

an undoing means for undoing the image processing which has been performed on the processing object image data set if the judgment by the intention judgment means is NO; and a control means for controlling the processing means so that the processing means performs the further image processing on the processing object image data set of which image processing has been undone by the undoing means.

The "image processing model" may be set by a user of a photography device at the photography device such as a digital camera. As the image processing mode, there are a fixed light source type mode such as a tungsten mode, a cloudy sky mode and a shade mode, a finish setting mode such as a portrait mode, a landscape/distant view mode, a macro/close-up mode and an underwater photography mode, and the like.

Here, an image data format is defined by Exif (Exchangeable image file format) of JEIDA (Japan Electronic Industry Development Association). Various kinds of information may be included in an Exif format file as tag information of the file. Therefore, supplementary information may be attached to the image data set by storing the supplementary information as the tag information. The supplementary information includes image processing information indicating an image processing mode, information indicating the date/time of photography, information indicating a photography location, a file name, information on a type of a photography device, or the like.

The term "judging whether the image processing mode has been intentionally set" refers to making judgment on whether the image processing mode has been intentionally set by a user of the photography device during obtainment of the image data set by photography or the like.

In the image processing apparatus according to the present invention, the intention judgment means may judge whether the image processing mode of the processing object image data set and an image processing mode of the image data set obtained immediately before obtainment of the processing object image data set are the same. If the judgment is YES, the intention judgment means may obtain a frequency of photography during obtainment of the processing object image data set and a time interval between photography of the image data set obtained immediately before obtainment of the processing object image data set and photography of the processing object image data set based on photography date/time information included in the supplementary information attached to the processing object image data set and photography date/time information included in the supplementary information attached to the at least one of image data sets, and further judge whether a relationship between the frequency of photography and the time interval of photography satisfies a predetermined relationship. If the further judgment is YES, the intention judgment means may judge that the image processing mode of the processing object image data set has been intentionally set.

In the image processing apparatus according to the present invention, the intention judgment means may judge whether the image processing mode of the processing object image data set and an image processing mode of the image data set obtained immediately before obtainment of the processing object image data set are the same. If the judgment is YES, the intention judgment means may further judge whether an obtainment location of the processing object image data set and an obtainment location of the image data set obtained immediately before obtainment of the processing object image data set are within a predetermined distance based on photography location information included in the supplementary information attached to the processing object image data set, and photography location information included in the supplementary information attached to the image data set which was obtained immediately before obtainment of the processing object image data set. If the further judgment is YES, the intention judgment means may judge that the image processing mode of the processing object image data set has been intentionally set.

In the image processing apparatus according to the present invention, if the intention judgment means judges that the image processing mode has been intentionally set, the control means may control the processing means so that the further image processing is performed on the processing object image data set by canceling or reducing a processing amount of image processing according to the image processing mode in the further image processing.

The term "canceling image processing" refers to not performing image processing.

An image processing method according to the present invention is an image processing method for obtaining a processed image data set, the method comprising the steps of:

performing further image processing on an image data set on which image processing has been performed according to an image processing mode set at a photography device and to which supplementary information including image processing information indicating the image processing mode has been attached;

judging whether the image processing mode of a processing object image data set has been intentionally set, based on supplementary information of the processing object image data set and supplementary information attached to at least one of image data sets which were obtained before or after photography time of the processing object image data set, wherein the at least one of image data sets includes an image data set obtained immediately before obtainment of the processing object image data set;

undoing the image processing which has been performed on the processing object image data set if the judgment by the intention judgment means is NO; and performing the further image processing on the processing object image data set of which image processing has been undone.

A program for causing a computer to execute the image processing method according to the present invention may also be provided.

According to the present invention, judgment is made on whether an image processing mode of a processing object image data set and an image processing mode of an image data set obtained immediately before obtainment of the processing object image data set are the same. If the judgment is NO, judgment is further made on whether the image processing mode of the processing object image data set has been intentionally set, based on supplementary information of the processing object image data set and supplementary information attached to at least one of image data sets which were obtained before or after photography time of the processing object image data set, wherein the at least one of image data sets includes an image data set obtained immediately before obtainment of the processing object image data set. If the further judgment is NO, the image processing which has been performed on the processing object image data set is undone. Then, further image processing is performed on the processing object image data set of which image processing has been undone. Therefore, even if a user erroneously set a photography mode during obtainment of the image data set with a photography device such as a digital camera, the effects of image processing according to the image processing mode may be eliminated and image processing may be performed on the processing object image data set in an appropriate manner.

Here, if a photograph was taken by setting an image processing mode and a photograph is taken again after at least a predetermined amount of time has passed after taking the photograph, an image processing mode in the earlier photography and an image processing mode in the later photography tend to be different from each other when a frequency of photography is lower and more time has passed after the earlier photography. Therefore, judgment is made on whether an image processing mode of a processing object image data set and an image processing mode of an image data set obtained immediately before obtainment of the processing object image data set are the same. If the judgment is YES, a frequency of photography during obtainment of the processing object image data set and a time interval between photography of an image data set obtained immediately before obtainment of the processing object image data set and photography of the processing object image data set are obtained based on photography date/time information included in the supplementary information of the processing object image data set and photography date/time information included in the supplementary information attached to the at least one of image data sets. Then, judgment is made on whether a relationship between the frequency of photography and the time interval of photography satisfies a predetermined relationship. If the judgment is YES, it is judged that the image processing mode of the processing object image data set has been intentionally set. Accordingly, judgment may be accurately made on whether the image processing mode of the processing object image data set has been erroneously set.

If a photograph was taken by setting an image processing mode and a photograph is taken again at a different location, an image processing mode in the earlier photography and an image processing mode in the later photography tend to be different from each other. Therefore, judgment is made on whether an image processing mode of a processing object image data set and an image processing mode of an image data set obtained immediately before obtainment of the processing object image data set are the same. If the judgment is YES, judgment is made on whether an obtainment location of the processing object image data set and an obtainment location of the image data set which was obtained immediately before obtainment of the processing object image data set are within a predetermined distance from each other based on photography location information included in the supplementary information of the processing object image data set and photography location information included in the supplementary information attached to the image data set obtained immediately before obtainment of the processing object image data set. If the judgment is YES, it is judged that the image processing mode of the processing object image data set has been intentionally set. Accordingly, judgment may be accurately made on whether the image processing mode of the processing object image data has been erroneously set.

If the judgment by the intention judgment means is YES, the further image processing is performed on the processing object image data set by canceling or reducing a processing amount of image processing according to the image processing mode of the processing object image data set in the further image processing. Accordingly, image processing may be performed on the image data set in an appropriate manner, on which image processing has already been performed, in considering the effects of the set image processing mode.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, and magnetic tapes. Additionally, computer instructions include, but are not limited to: source, object and executable code, and can be in any language including higher level languages, assembly language, and machine language.

DESCRIPTION OF THE PREFERRED EMBODIMENTS

Figure 1:
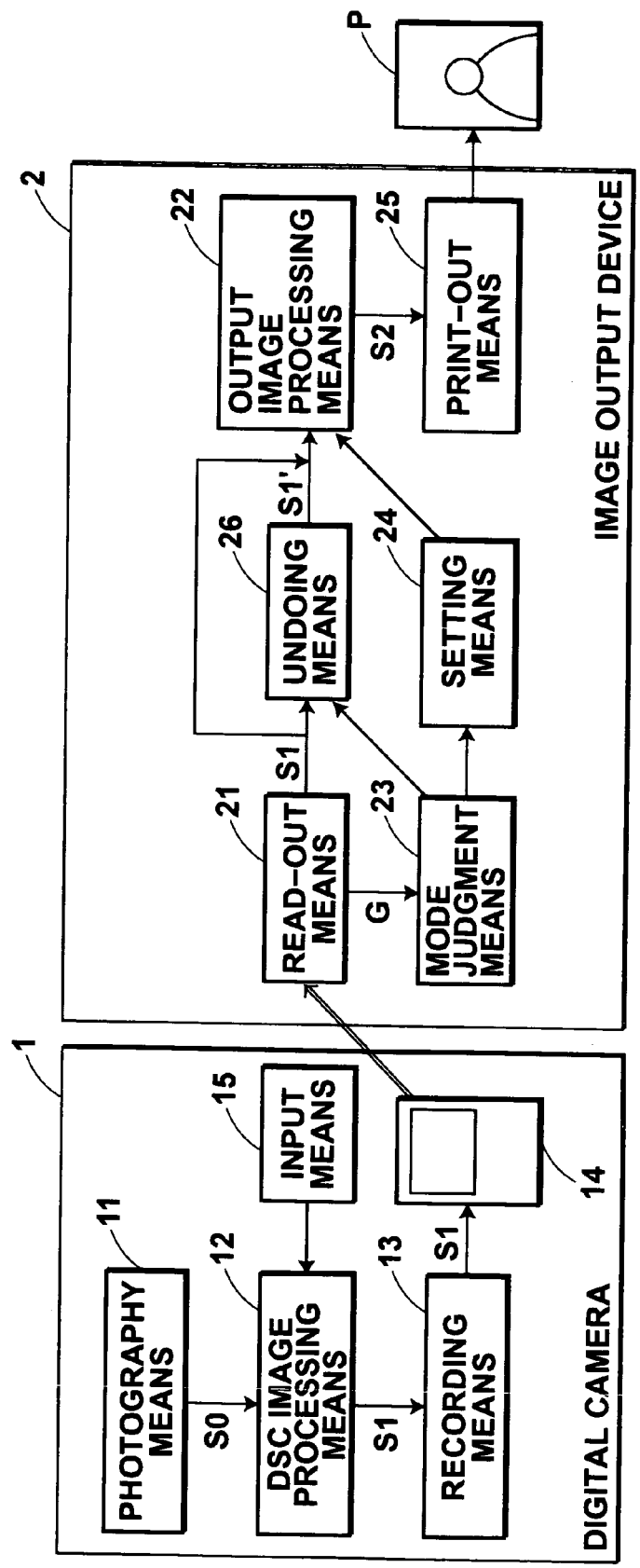
FIG. 1 is a schematic block diagram illustrating the configuration of an image output system to which an image processing apparatus according to an embodiment of the present invention has been applied.

Hereinafter, embodiments of the present invention will be described with reference to the attached drawings. FIG. 1 is a schematic block diagram illustrating the configuration of an image output system to which an image processing apparatus according to an embodiment of the present invention has been applied. As illustrated in FIG. 1, the image output system according to the present embodiment includes a digital camera 1 and an image output device 2. An image data set S1 is obtained with the digital camera 1 and output as a print P from the image output device 2.

The digital camera 1 includes a photography means 11 having a lens, a shutter, a CCD and the like, a DSC image processing means 12 for obtaining an image data set S1 to be output, by performing image processing on an image data set S0 obtained with the photography means 11, a recording means 13 for recording the image data set S1 in a memory card 14 and an input means 15 such as a select dial and a setting button, for setting various kinds of settings on the DSC image processing means 12.

A user who is a photographer may set a kind of image processing which will be performed on the image data set S0 obtained by photography, by setting an image processing mode with the input means 15. As image processing modes, there are automatic white balance adjustment processing, white balance adjustment processing according to a light source type (a tungsten mode, a cloudy sky mode, a shade mode or the like), gradation correction processing, density correction processing, color correction processing, sharpness processing, monochrome processing, sepia processing, a finish setting mode (a night view/fireworks mode, a portrait mode, a landscape/distant view mode, a macro/close-up mode, an underwater mode, a user exposure correction mode or the like) and the like. Image processing according to the image processing mode may be performed on the image data set S0. Here, the user exposure correction mode is a mode wherein a user manually corrects the exposure condition. Further, an automatic bracket function, photography using an optical filter, soft-focus photography, interval photography, continuous shooting, multiple exposure, synthesis with a template, synthesis with a frame or the like may also be set.

The DSC image processing means 12 obtains the image data set S1 to be output, by performing image processing on the image data set S0 according to the image processing mode set by the user who is the photographer. For example, if a fixed light source type mode such as the tungsten mode, the cloudy sky mode and the shade mode has been set, a white balance adjustment processing according to the set fixed light source type mode is performed on the image data set S0 and the image data set S1 to be output is obtained. If a portrait mode has been set as the finish setting mode, processing for reducing sharpness and gradation correction processing for softening gradation is performed on the image data set S0, and the image data set S1 to be output is obtained. Further, if a landscape mode has been set, processing for increasing sharpness and gradation correction processing for hardening gradation is performed on the image data set S0, and the image data set S1 to be output is obtained.

The image data set S1 to be output is an image data set in the Exif format. Image processing information indicating the image processing mode of the image processing which has been performed on the image data set S1, or the like is included in tag information G of the image data set S1 to be output. Further, the tag information G includes photography date/time information indicating date/time of photography of the image data set S1 and type information indicating a type of the digital camera 1.

The recording means 13 records the image data set S1 to which the tag information G has been attached in the memory card 14.

In the digital camera 1 as described above, the photography means 11 obtains the image data set S0. The DSC image processing means 12 performs image processing on the image data set S0 based on an image processing mode input from the input means 15 and obtains the image data set S1 to be output. Further, the image processing mode as the image processing information is included in the tag information G of the image data set S1 to be output. The recording means 13 records the image data set S1 in the memory card 14.

The image output device 2 includes a read-out means 21 such as a card slot, for reading out the image data set S1 which is a processing object and a plurality of image data sets S10 which were obtained before or after photography time of the image data set S1 from the memory card 14. The image output device 2 also includes an output image processing means 22 for obtaining a processed image data set S2 by performing image processing on the image data set S1, a mode judgment means 23 for judging whether the image processing mode set during obtainment of the image data set S1 was intentionally set by a user of the digital camera 1, a setting means 24 for setting contents of image processing which will be performed on the image data set S1 by the output image processing means 22, based on the judgment result of the mode judgment means 23 and a print-out means 25 for printing out the processed image data set S2. The image output device 2 also includes an undoing means 26 for obtaining an image data set S1' of which image processing has been undone by undoing the image processing which has been performed on the image data set S1 if the mode judgment means 23 judges that the image processing mode during obtainment of the image data set S1 was not intentionally set by the user of the digital camera 1. The undoing means 26 inputs the image data set S1' to the output image processing means 22 instead of the image data set S1.

Figure 2:
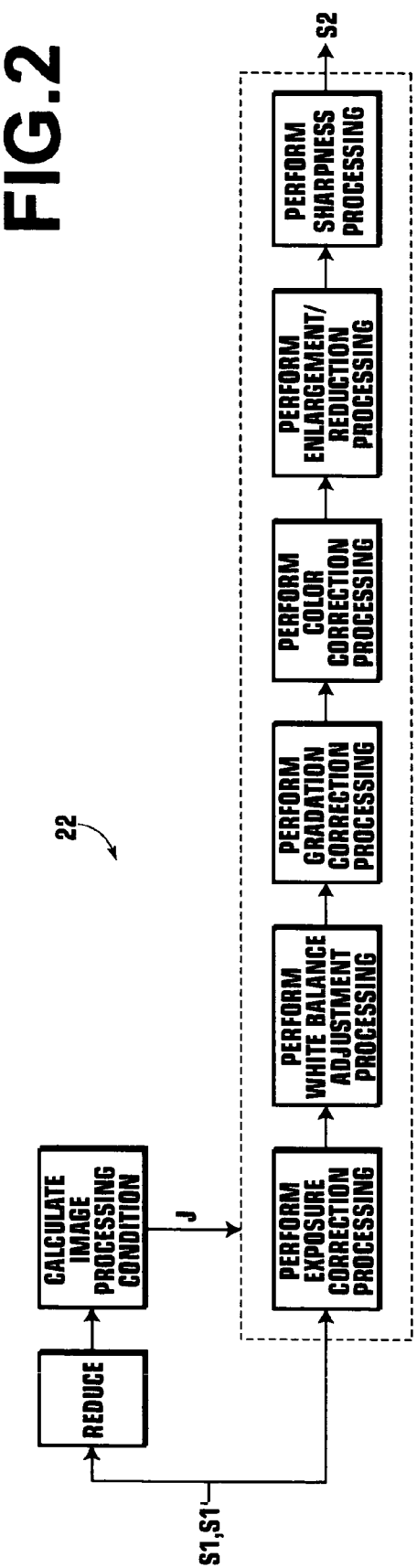
FIG. 2 is a schematic block diagram illustrating processing performed by an output image processing means.

FIG. 2 shows a schematic block diagram illustrating processing performed by the output image processing means 22. As illustrated in FIG. 2, the output image processing means 22 reduces the image data sets S1 and S1' and calculates an image processing condition J based on the reduced image data sets S1 and S1'. The output image processing means 22 performs exposure correction processing, white balance adjustment processing, gradation correction processing, color correction processing, enlargement/reduction processing for adjusting a size and sharpness processing on the image data sets S1 and S1' based on the calculated image processing condition J and obtains the processed image data set S2. The setting means 24 sets contents of image processing which will be performed by the output image processing means 22.

The mode judgment means 23 refers to the image processing information included in the tag information G of the image data set S1 and image processing information included in a tag information G of an image data set (called S11), which was obtained immediately before obtainment of the image data set S1, in the plurality of image data sets S10 and judges whether an image processing mode of the image data set S1 and an image processing mode of the image data set S11 are the same (First Judgment).

If the first judgment is NO, the mode judgment means 23 judges that the image processing mode of the image data set S1 has been intentionally set by the user of the digital camera 1 and outputs the judgment result to the setting means 24.

In contrast, if the first judgment is YES, the mode judgment means 23 refers to photography date/time information included in the tag information G of the image data set S1 and photography date/time information included in the tag information G of the plurality of image data sets S10, and obtains a number of image data sets obtained within a predetermined period of time (a few hours, for example) before obtainment of the image data set S1 as a frequency of photography. Alternatively, a total number of the image data set S1 and the plurality of image data sets S10 may be divided by a length of a time interval between the most recent photography date/time and the oldest photography date/time in the plurality of image data sets S10 and the division result may be used as the frequency of photography. The mode judgment means 23 obtains the time interval between photography of the image data set S11 and photography of the image data set S1 based on the photography date/time information included in the tag information G of the image data set S1 and the photography date/time information included in the tag information G of the image data set S11 obtained immediately before obtainment of the image data set S1.

Figure 3:
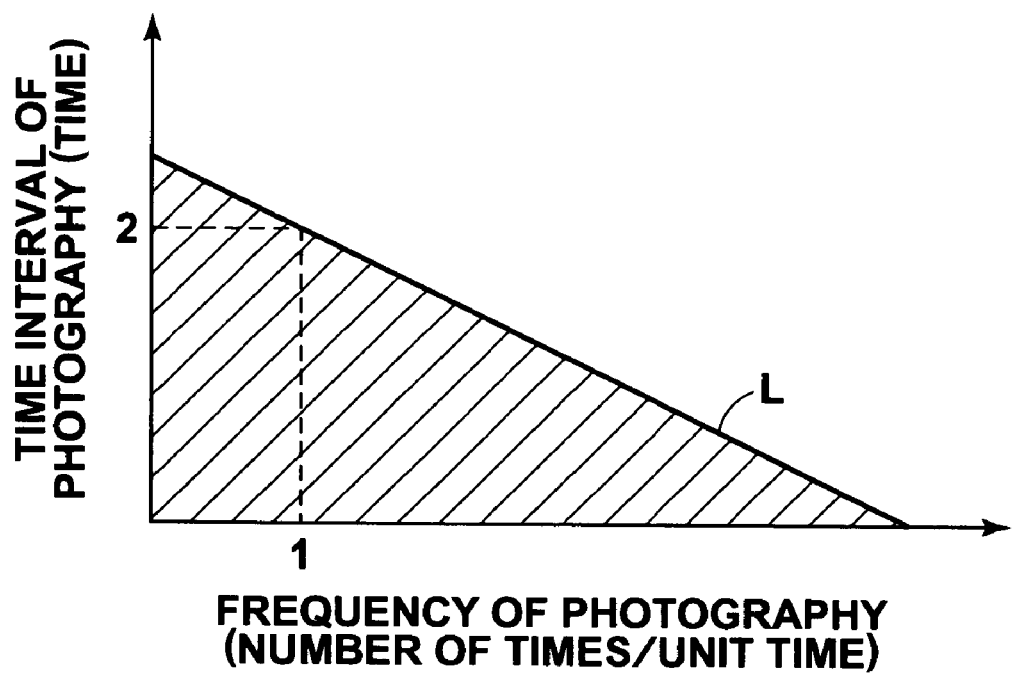
FIG. 3 is a graph illustrating a relationship between a frequency of photography and a time interval of photography.

Here, a relational expression which defines a straight line L showing a relationship between a frequency of photography and a time interval of photography, as illustrated in FIG. 3 is stored in the mode judgment means 23. The obtained frequency of photography and time interval of photography is plotted on the graph showing the relational expression and judgment is made on whether the plot is below the straight line L defined by the relational expression, (i.e., in a shaded area in FIG. 3) (Second Judgment). Here, for example, if the frequency of photography per unit time is once and the time interval of photography is two hours or more, the plot is above the straight line L. Therefore, the second judgment is NO. In contrast, if the frequency of photography per unit time is once and the time interval of photography is one hour, the plot is below the straight line L. Therefore, the second judgment is YES.

If the second judgment is YES, the mode judgment means 23 judges that the image processing mode of the image data set S1 has been intentionally set by the user of the digital camera 1 and outputs the judgment result to the setting means 24.

Here, if a photograph was taken by setting an image processing mode and a photograph is taken again after at least a predetermined period of time has passed after taking the photograph, an image processing mode in the earlier photography and an image processing mode in the later photography tend to be different from each other when a frequency of photography is lower and more time has passed after the earlier photography. Therefore, if the second judgment is NO, the mode judgment means 23 judges that the image processing mode of the image data set S1 has not been intentionally set by the user and outputs the judgment result to the setting means 24 and the undoing means 26.

The setting means 24 sets the contents of image processing which will be performed by the output image processing means 22, based on the judgment result output by the mode judgment means 23. Specifically, if the first judgment is NO or if the first judgment is YES and the second judgment is also YES, the setting means 24 sets the output image processing means 22 not to perform the image processing according to the image processing mode of the image data set S1. For example, if the image processing mode is the fixed light source type mode such as the tungsten mode, the cloudy sky mode and the shade mode, the setting means 24 sets the output image processing means 22 not to perform the white balance adjustment processing. If the image processing mode is the portrait mode or the landscape mode, the setting means 24 sets the output image processing means 22 not to perform the gradation correction processing and the sharpness processing.

In contrast, if the first judgment is YES and the second judgment is NO, the setting means 24 sets the output image processing means 22 to perform regular processing. The regular processing is the processing of performing all of the exposure correction processing, white balance adjustment processing, gradation correction processing, color correction processing, enlargement/reduction processing for adjusting a size and sharpness processing.

If the judgment result that the first judgment is YES and the second judgment is NO is input from the mode judgment means 23 to the undoing means 26, the undoing means 26 undoes the image processing which has been performed on the image data set S1.

For example, if the image data set S1 has been obtained by setting the fixed light source type mode such as the tungsten mode, a hue of the image (hereinafter, the reference sign S1 is also used to indicate the image) represented by the image data set S1 varies according the light source type. Therefore, processing for eliminating the hue variation is performed. Specifically, the image processing which has been performed on the image data set S1 is undone by multiplying an RGB value of each of the pixels of the image S1 by a reciprocal of an RGB gain value in the digital camera 1.

The RGB gain value varies according the type of the digital camera 1. Therefore, a table showing RGB gain values according to types of the digital camera 1 is stored in the undoing means 26. When the undoing means 26 undoes image processing, the undoing means 26 refers to information on the type of the digital camera 1, included in the tag information G of the image data set S1 and the stored table and obtains an RGB gain value corresponding to the type of the digital camera 1 with which the image data set S1 has been obtained.

Here, if the RGB gain value of each type of the digital camera 1 is known in advance, the RGB gain value should be registered in the table. However, if the RGB gain value of the digital camera 1 is not known, a tungsten mode should be set at the digital camera 1 and a gray chart should be photographed with the digital camera 1 outdoors where photographs are most frequently taken, for example. Consequently, an image data set including an RGB color data set is obtained. Then, a correction gain which satisfies R=G=B is obtained as the RGB gain value. The RGB gain value should be registered in the table.

Further, when the undoing means 26 undoes the image processing, if the image data set S1 is an sRGB signal, the undoing means 26 may accurately undo the image processing by converting each of the R, G and B color data sets included in the image data set S1 into an antilogarithm and using a correction gain which satisfies R=G=B as the RGB gain value. Therefore, if the image data set S1 is the sRGB signal, each of the R, G and B color data sets included in the image data set S1 should be converted into an antilogarithm by the following formulas (1). The following formulas (1) only show the conversion regarding R. However, G and B may also converted into antilogarithms by similar formulas.

$R' = R/255$ $R'' = ((R'+0.055)/1.055)^{3.4} (R' \geqq 0.03928)$ $R'' = R'/12.92 (0 \leqq R' \leqq 0.03928)$ (1)

Note, R'': antilogarithm.

If the image data set S1 was obtained by setting a portrait mode, the sharpness has been reduced and the gradation has been softened. Therefore, an image data set S1' of which image processing has been undone is obtained by performing image processing for increasing the sharpness and hardening the gradation on the image data set S1.

In the present embodiment, when the portrait mode was set at the digital camera 1, image processing for reducing the sharpness and softening the gradation has been performed. However, even if the portrait mode was set, a level of image processing performed at the digital camera 1 varies according to the type of the digital camera 1. Therefore, the undoing means 26 stores a table showing levels of image processing performed according to the type of the digital camera 1 when the portrait mode is set. When the undoing means 26 undoes the image processing according to the portrait mode, the undoing means 26 refers to the information on the type, included in the tag information G of the image data set S1 and the stored table. The undoing means 26 obtains a level of image processing which is performed when the portrait mode is set, corresponding to the type of the digital camera 1 with which the image data set S1 has been obtained. The undoing means 26 undoes the image processing performed on the image data set S1 according to the level of image processing.

Here, if the level of image processing performed by the digital camera 1 is known in advance for each type of digital camera, the level of image processing should be registered in the table. However, there are cases where the level of image processing is not known. In such cases, each of a black and white rectangular wave chart and a grey step chart is photographed by setting the portrait mode at the digital camera 1 and by not setting any image processing mode at the digital camera 1. A difference in frequency characteristics and a difference in gradation characteristics of the image data sets obtained by setting the portrait mode and the image data sets obtained by not setting any image processing mode should be obtained. Then, the differences may be registered in the table as the level of image processing.

Figure 4:
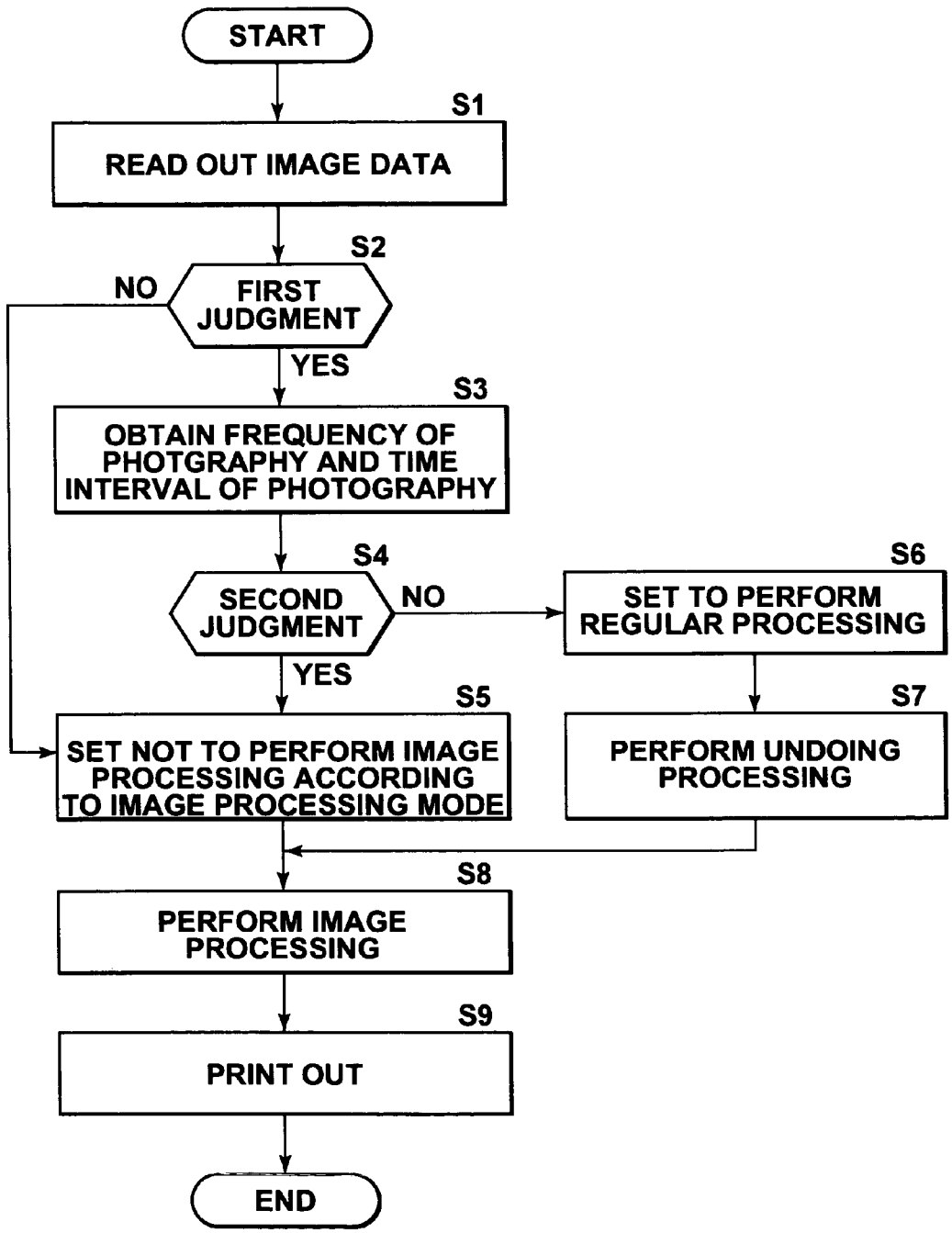
FIG. 4 is a flow chart illustrating an operation of the image output device according to an embodiment of the present invention.

Next, an operation of the image output device 2 according to the present embodiment will be described. FIG. 4 is a flow chart illustrating an operation of the image output device 2 in the present embodiment. First, the read-out means 21 reads out the image data set S1 and the plurality of image data sets S10 from the memory card 14 (step S1). The read-out means 21 inputs tag information G attached to each of the image data set S1 and the plurality of image data sets S10 which have been read out to the mode judgment means 23. The mode judgment means 23 refers to the image processing information in the tag information G of the image data set S1 and the image processing information included in the tag information G of the image data set S11 obtained immediately before obtainment of the image data set S1 in the plurality of image data sets S10 and judges whether the image processing mode of the image data set S and the image processing mode of the image data set S11 are the same (First Judgment, step S2).

If step S2 is YES, the frequency of photography and the time interval of photography are obtained (step S3). The obtained frequency of photography and the obtained time interval of photography are plotted on a graph represented by a relational expression which has been stored in advance, as illustrated in FIG. 3. Then, judgment is made on whether the plot is below a straight line L defined by the relational expression (i.e., in the shaded area in FIG. 3) (Second Judgment, step S4).

If step S4 is YES, the image processing mode has been intentionally set by the user. Therefore, the mode judgment means 23 outputs the judgment result to the setting means 24. The setting means 24 sets the output image processing means 22 not to perform the image processing according to the image processing mode (step S5). Even if step S2 is NO, the processing goes to step S5 and the setting means 24 sets the output image processing means 22 not to perform the image processing according to the image processing mode.

If step S4 is NO, the image processing mode has not been intentionally set by the user. Therefore, the mode judgment means 23 outputs the judgment result to the setting means 24 and the undoing means 26. The setting means 24 sets the output image processing means 22 to perform the regular image processing (step S6). Further, the undoing means 26 undoes the image processing which has been performed on the image data set S1 (undoing processing), and obtains the image data set S1' of which image processing has been undone. The undoing means 26 inputs the image data set S1', of which image processing has been undone, to the output image processing means 22 instead of the image data set S1 (step S7). Step S6 and step S7 may be performed in parallel. Alternatively, step S7 may be performed before step S6.

After the contents of image processing have been set as stated above, the output image processing means 22 performs image processing on the image data set S1 or the image data set S1' and obtains the processed image data set S2 (step S8). The processed image data set S2 is printed out as a print P from the print-out means 25 (step S9) and processing ends.

As described above, in the present embodiment, the first judgment is made to judge whether the image processing mode of the image data set S1 and the image processing mode of the image data set S11 are the same. If the judgment is YES, the frequency of photography and the time interval of photography are obtained. Then, the second judgment is made to judge whether the frequency of photography and the time interval of photography are below the straight line L in FIG. 3, which is defined by the relational expression which has been stored in advance. If the second judgment is NO, it is also judged that the image processing mode set during obtainment of the image data set S1 is not intentionally set by the user and the image processing performed on the image data set S1 is undone.

Therefore, even if a user erroneously sets image processing mode during obtainment of the image data set S1 with the digital camera 1, the effects of the image processing according to the image processing mode may be eliminated and image processing may be performed on the image data set S1 in an appropriate manner.

Here, if a photograph was taken by setting an image processing mode and a photograph is taken again after a predetermined period of time has passed after taking the photograph, the image processing mode in the earlier photography and the image processing mode in the later photography tend to be different from each other when a frequency of photography is lower and more time has passed after the earlier photography. Therefore, the first judgment is made and if the first judgment is YES, the second judgment is made. If the second judgment is NO, it is judged that the image processing mode of the image data set S1 has not been intentionally set. Accordingly, judgment may be accurately made on whether the image processing mode of the image data set S which is a processing object has been erroneously set.

It is preferable that information indicating the judgment result by the mode judgment means 23 and the contents of image processing performed on the image data set S1 are printed on the back of the print P, or the like. For example, a message such as "Because portrait mode was not intentionally set by the user, regular image processing has been performed." may be printed. At this time, illustrations that can specify the judgment result and the contents of image processing may be printed instead of characters. Accordingly, a user who sees the print P may easily recognize whether the image processing mode set at the digital camera 1 during photography was correct or wrong.

Further, in the embodiment as described above, if the above-mentioned first judgment is YES, the frequency of photography and the time interval of photography are obtained. Then, judgment is made on whether the relationship of the frequency of photography and the time interval of photography is below the straight line L in FIG. 3, which is defined by the relational expression which has been stored in advance. Accordingly, judgment is made on whether the image processing mode has been intentionally set by the user. When a photograph is taken by setting an image processing mode and a photograph is taken again at a different location, the image processing mode in the early photography and the image processing mode in the later photography tend to be different from each other.

Therefore, a GPS function for receiving a radio wave for positioning from a GPS satellite may be provided in the digital camera 1, and photography location information indicating photography location (i.e., latitude and longitude) may be included in the tag information G of the image data set S1.

If the first judgment is YES, judgment may be further made on whether a distance between the photography location of the image data set S1 and the photography location of the image data set S11, which was obtained immediately before obtainment of the image data set S1, is within a predetermined distance (for example, 500 m). If the further judgment is NO, it may be judged that the image processing mode has not been intentionally set by the user. Below, this operation will be described as another embodiment of the present invention.

Figure 5:
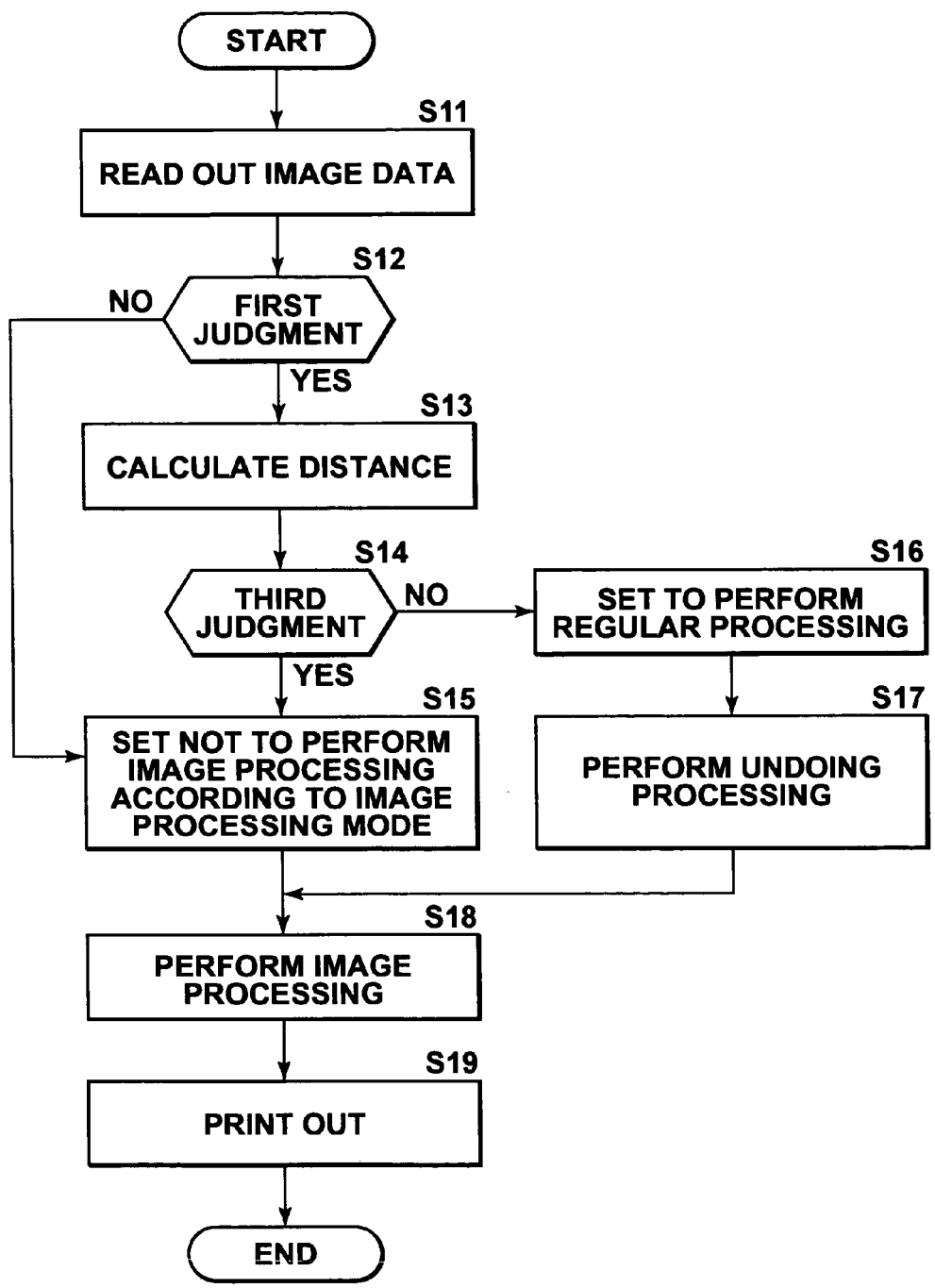
FIG. 5 is a flow chart illustrating an operation of the image output device according to another embodiment of the present invention.

FIG. 5 is a flow chart illustrating an operation of the image output device 2 according to the other embodiment of the present invention. First, the read-out means 21 reads out the image data set S1 and the image data set S11, which was obtained immediately before obtainment of the image data set S1, from the memory card 14 (step S11). The read-out means 21 inputs the tag information G attached to each of the image data set S and image data set S11, which have been read out to the mode judgment means 23. The mode judgment means 23 refers to the image processing information included in the tag information G of the image data set S1 and the image processing information included in the tag information G of the image data set S11 and judges whether the image processing mode of the image data set S1 and the image processing mode of the image data set S11 are the same (First Judgment, step S12).

If step S12 is YES, the mode judgment means 23 calculates a distance between the photography location of the image data set S1 and the photography location of the image data set S11 based on the photography location information included in the tag information G of the image data set S1 and the photography location information included in the tag information G of the image data set S11 (step S13). Then, judgment is made on whether the distance is within a predetermined distance (Third Judgment, step S14).

If step S14 is YES, the image processing mode has been intentionally set by the user. Therefore, the mode judgment means 23 outputs the judgment result to the setting means 24 and the setting means 24 sets the output image processing means 22 not to perform the image processing according to the image processing mode (step S15). If step S12 is NO, the processing also goes to step S15 and the setting means 24 sets the output image processing means 22 not to perform the image processing according to the image processing mode.

If step S14 is NO, the image processing mode has not been intentionally set by the user. Therefore, the mode judgment means 23 outputs the judgment result to the setting means 24 and the undoing means 26. The setting means 24 sets the output image processing means 22 to perform the regular image processing (step S16). Further, the undoing means 26 undoes the image processing which has been performed on the image data set S1 (undoing processing) and obtains the image data set S1' of which image processing has been undone. The undoing means 26 inputs the image data set S1' of which image processing has been undone to the output image processing means 22 instead of the image data set S1 (step S17). Step S16 and step S17 may be performed in parallel. Alternatively, step S17 may be performed before step S16.

After the contents of the image processing have been set as described above, the output image processing means 22 performs image processing on the image data set S1 or the image data set S1' and obtains the processed image data set S2 (step S18). The processed image data set S2 is printed out as a print P from the print-out means 25 (step S19) and processing ends.

In each of the above-described embodiments, a monitor for displaying various kinds of information may be provided in the image output device 2. The judgment result by the mode judgment means 23 may be displayed on the monitor to make the operator select whether the processing should be continued according to the result.

Further, in each of the above-described embodiments, if it is judged that the image processing mode has been intentionally set by the user, the image processing according to the image processing mode is not performed. However, the regular image processing may be performed by reducing the processing amount of the image processing according to the image processing mode.

What is claimed is:

1. An image processing apparatus comprising:
   a processing means for obtaining a processed image data set by performing further image processing on an image data set, on which image processing has been performed according to an image processing mode set at a photography device and to which supplementary information including image processing information indicating the image processing mode has been attached;
   an intention judgment means for judging whether an image processing mode of a processing object image data set has been intentionally set, based on supplementary information of the processing object image data set and supplementary information attached to at least one of image data sets, which were obtained before or after photography time of the processing object image data set, wherein the at least one of image data sets includes an image data set obtained immediately before obtainment of the processing object image data set;
   an undoing means for undoing the image processing which has been performed on the processing object image data set if the judgment by the intention judgment means is NO; and
   a control means for controlling the processing means so that the processing means performs the further image processing on the processing object image data set, of which image processing has been undone by the undoing means,
   wherein the intention judgment means judges whether the image processing mode of the processing object image data set and an image processing mode of the image data set obtained immediately before obtainment of the processing object image data set are the same,
   wherein if the judgment is YES, the intention judgment means further judges whether an obtainment location of the processing object image data set and an obtainment location of the image data set obtained immediately before obtainment of the processing object image data set are within a predetermined distance based on photography location information included in the supplementary information attached to the processing object image data set and photography location information included in the supplementary information attached to the image data set which was obtained immediately before obtainment of the processing object image data set,
   wherein if the further judgment is YES, the intention judgment means judges that the image processing mode of the processing object image data set has been intentionally set.

2. An image processing apparatus as defined in claim 1, wherein if the judgment by the intention judgment means is YES, the control means controls the processing means so that the processing means performs the further image processing on the processing object image data set by canceling or reducing a processing amount of image processing according to the image processing mode in the further image processing.

3. An image processing apparatus as defined in claim 1, wherein the image processing mode can be set by a user of the photography device at the photography device.

4. An image processing apparatus as defined in claim 3, wherein the image processing mode is at least one of a fixed light source type mode including a tungsten mode, a cloudy sky mode or a shade mode, a portrait mode, a landscape/distant view mode, a macro/close-up mode and an underwater photography mode.

5. The image processing apparatus according to claim 1, wherein the image processing mode is at least one of an automatic white balance adjustment processing mode, and a white balance adjustment processing mode according to a light source type.

6. The image processing apparatus according to claim 1, wherein the processing object image data set and the at least one of the image data sets exist in memory simultaneously, and the supplementary information of the processing object image data set is attached as a first tag to the processing object image data set, and the supplementary information of the at least one of the image data sets obtained before or after the photography time of the processing object image data set is attached as a second tag to the at least one of the image data sets.

7. An image processing apparatus comprising:
a processing means for obtaining a processed image data set by performing further image processing on an image data set, on which image processing has been performed according to an image processing mode set at a photography device and to which supplementary information including image processing information indicating the image processing mode has been attached;
an intention judgment means for judging whether an image processing mode of a processing object image data set has been intentionally set, based on supplementary information of the processing object image data set and supplementary information attached to at least one of image data sets, which were obtained before or after photography time of the processing object image data set, wherein the at least one of image data sets includes an image data set obtained immediately before obtainment of the processing object image data set;
an undoing means for undoing the image processing which has been performed on the processing object image data set if the judgment by the intention judgment means is NO; and
a control means for controlling the processing means so that the processing means performs the further image processing on the processing object image data set, of which image processing has been undone by the undoing means,
wherein the intention judgment means judges whether the image processing mode of the processing object image data set and an image processing mode of the image data set obtained immediately before obtainment of the processing object image data set are the same,
wherein if the judgment is YES, the intention judgment means obtains a frequency of photography during obtainment of the processing object image data set and a time interval between photography of the image data set obtained immediately before obtainment of the processing object image data set and photography of the processing object image data set based on photography date/time information included in the supplementary information attached to the processing object image data set and photography date/time information included in the supplementary information attached to the at least one of image data sets and further judges whether a relationship between the frequency of photography and the time interval of photography satisfies a predetermined relationship,
wherein if the further judgment is YES, the intention judgment means judges that the image processing mode of the processing object image data set has been intentionally set.

8. An image processing apparatus as defined in claim 7, wherein if the intention judgment means judges that the image processing mode of the processing object image data set has been intentionally set, the control means controls the processing means so that the processing means performs the further image processing on the processing object image data set by canceling or reducing a processing amount of image processing according to the image processing mode in the further image processing.

9. An image processing method for obtaining a processed image data set, the method comprising the steps of:
performing further image processing on an image data set, on which image processing has been performed according to an image processing mode set at a photography device and to which supplementary information including image processing information indicating the image processing mode has been attached;
judging whether an image processing mode of a processing object image data set has been intentionally set, based on supplementary information of the processing object image data set and supplementary information attached to at least one of image data sets, which were obtained before or after photography time of the processing object image data set, wherein the at least one of image data sets includes an image data set obtained immediately before obtainment of the processing object image data set;
undoing the image processing which has been performed on the processing object image data set if the judgment is NO; and
performing the further image processing on the processing object image data set, of which image processing has been undone,
wherein the judging whether the image processing mode of the processing object image data set has been intentionally set comprises judging whether the image processing mode of the processing object image data set and an image processing mode of the image data set obtained immediately before obtainment of the processing object image data set are the same,
wherein if the judgment is YES, the judging whether the image processing mode of the processing object image data set has been intentionally set further comprises judging whether an obtainment location of the processing object image data set and an obtainment location of the image data set obtained immediately before obtainment of the processing object image data set are within a predetermined distance based on photography location information included in the supplementary information attached to the processing object image data set and photography location information included in the supplementary information attached to the image data set which was obtained immediately before obtainment of the processing object image data set,
wherein if the further judgment is YES, the judging whether the image processing mode of the processing object image data set has been intentionally set further comprises judging that the image processing mode of the processing object image data set has been intentionally set.

10. The method according to claim 9, wherein if it is judged in the judging whether the image processing mode of the processing object image data set has been intentionally set that the image processing mode has been intentionally set, the performing the further image processing further comprises performing the further image processing on the processing object image data set by canceling or reducing a processing amount of image processing according to the image processing mode in the further image processing.

11. The image processing method according to claim 9, wherein the image processing mode is at least one of a gradation correction processing mode, a density correction processing mode, a color correction processing mode, and a sharpness processing.

12. The image processing method according to claim 9, wherein the processing object image data set and the at least one of the image data sets exist in memory simultaneously, and the supplementary information of the processing object image data set is attached as a first tag to the processing object image data set, and the supplementary information of the at least one of the image data sets obtained before or after the photography time of the processing object image data set is attached as a second tag to the at least one of the image data sets.

13. A computer readable medium storing a program for causing a computer to execute an image processing method for obtaining a processed image data set, the method comprising:

performing further image processing on an image data set on which image processing has been performed according to an image processing mode set at a photography device and to which supplementary information including image processing information indicating the image processing mode has been attached;

judging whether an image processing mode of a processing object image data set has been intentionally set, based on supplementary information of the processing object image data set and supplementary information attached to at least one of image data sets which were obtained before or after photography time of the processing object image data set, wherein the at least one of image data sets includes an image data set obtained immediately before obtainment of the processing object image data set;

undoing the image processing which has been performed on the processing object image data set if the judgment is NO; and performing the further image processing on the processing object image data set of which image processing has been undone, wherein the judging whether the image processing mode of the processing object image data set has been intentionally set comprises judging whether the image processing mode of the processing object image data set and an image processing mode of the image data set obtained immediately before obtainment of the processing object image data set are the same, wherein if the judgment is YES, the judging whether the image processing mode of the processing object image data set has been intentionally set further comprises judging whether an obtainment location of the processing object image data set and an obtainment location of the image data set obtained immediately before obtainment of the processing object image data set are within a predetermined distance based on photography location information included in the supplementary information attached to the processing object image data set and photography location information included in the supplementary information attached to the image data set which was obtained immediately before obtainment of the processing object image data set, wherein if the further judgment is YES, the judging whether the image processing mode of the processing object image data set has been intentionally set further comprises judging that the image processing mode of the processing object image data set has been intentionally set.

14. The computer readable medium according to claim 13, wherein if it is judged in the judging whether the image processing mode of the processing object image data set has been intentionally set that the image processing mode has been intentionally set, the performing the further image processing further comprises performing the further image processing on the processing object image data set by canceling or reducing a processing amount of image processing according to the image processing mode in the further image processing.

15. The computer readable medium according to claim 13, wherein the image processing mode is at least one of an automatic white balance adjustment processing mode, and a white balance adjustment processing mode according to a light source type.

16. The computer readable medium according to claim 13, wherein the processing object image data set and the at least one of the image data sets exist in memory simultaneously, and the supplementary information of the processing object image data set is attached as a first tag to the processing object image data set, and the supplementary information of the at least one of the image data sets obtained before or after the photography time of the processing object image data set is attached as a second tag to the at least one of the image data sets.

17. An image processing method for obtaining a processed image data set, the method comprising the steps of:

performing further image processing on an image data set, on which image processing has been performed according to an image processing mode set at a photography device and to which supplementary information including image processing information indicating the image processing mode has been attached;

judging whether an image processing mode of a processing object image data set has been intentionally set, based on supplementary information of the processing object image data set and supplementary information attached to at least one of image data sets, which were obtained before or after photography time of the processing object image data set, wherein the at least one of image data sets includes an image data set obtained immediately before obtainment of the processing object image data set;

undoing the image processing which has been performed on the processing object image data set if the judgment is NO; and performing the further image processing on the processing object image data set, of which image processing has been undone, wherein the judging whether the image processing mode of the processing object image data set has been intentionally set comprises judging whether the image processing mode of the processing object image data set and an image processing mode of the image data set obtained immediately before obtainment of the processing object image data set are the same, wherein if the judgment is YES, judging whether the image processing mode of the processing object image data set has been intentionally set further comprises obtaining a frequency of photography during obtainment of the processing object image data set and obtaining a time interval between photography of the image data set obtained immediately before obtainment of the processing object image data set and photography of the processing object image data set based on photography date/time information included in the supplementary information attached to the processing object image data set and photography date/time information included in the supplementary information attached to the at least one of image data sets and further judging whether a relationship between the frequency of photography and the time interval of photography satisfies a predetermined relationship, wherein if the further judgment is YES, the judging whether the image processing mode of the processing object image data set has been intentionally set further comprises judging that the image processing mode of the processing object image data set has been intentionally set.

18. A computer readable medium storing a program for causing a computer to execute an image processing method for obtaining a processed image data set, the method comprising:

performing further image processing on an image data set on which image processing has been performed according to an image processing mode set at a photography device and to which supplementary information including image processing information indicating the image processing mode has been attached;

judging whether an image processing mode of a processing object image data set has been intentionally set, based on supplementary information of the processing object image data set and supplementary information attached to at least one of image data sets which were obtained before or after photography time of the processing object image data set, wherein the at least one of image data sets includes an image data set obtained immediately before obtainment of the processing object image data set;

undoing the image processing which has been performed on the processing object image data set if the judgment is NO; and performing the further image processing on the processing object image data set of which image processing has been undone, wherein the judging whether the image processing mode of the processing object image data set has been intentionally set comprises judging whether the image processing mode of the processing object image data set and an image processing mode of the image data set obtained immediately before obtainment of the processing object image data set are the same, wherein if the judgment is YES, judging whether the image processing mode of the processing object image data set has been intentionally set further comprises obtaining a frequency of photography during obtainment of the processing object image data set and obtaining a time interval between photography of the image data set obtained immediately before obtainment of the processing object image data set and photography of the processing object image data set based on photography date/time information included in the supplementary information attached to the processing object image data set and photography date/time information included in the supplementary information attached to the at least one of image data sets and further judging whether a relationship between the frequency of photography and the time interval of photography satisfies a predetermined relationship, wherein if the further judgment is YES, the judging whether the image processing mode of the processing object image data set has been intentionally set further comprises judging that the image processing mode of the processing object image data set has been intentionally set.

19. An image processing apparatus comprising:

a processing circuit which obtains a processed image data set by performing further image processing on an image data set, on which image processing has been performed according to an image processing mode set at a photography device and to which supplementary information including image processing information indicating the image processing mode has been attached;

an intention judgment circuit which judges whether an image processing mode of the image data set has been intentionally set, based on supplementary information of the image data set and supplementary information attached to at least one of image data sets, which were obtained before or after photography time of the image data set, wherein the at least one of the image data sets includes an image data set obtained immediately before obtainment of the image data set;

an undoing circuit for undoing the image processing which has been performed on the image data set if the judgment by the intention judgment circuit is NO; and a control circuit which controls the processing circuit so that the processing circuit performs the further image processing on the image data set, of which the image processing has been undone by the undoing circuit, to obtain the processed image data set, wherein the intention judgment circuit judges whether the image processing mode of the processing object image data set and an image processing mode of the image data set obtained immediately before obtainment of the processing object image data set are the same, wherein if the judgment is YES, the intention judgment circuit further judges whether an obtainment location of the processing object image data set and an obtainment location of the image data set obtained immediately before obtainment of the processing object image data set are within a predetermined distance based on photography location information included in the supplementary information attached to the processing object image data set and photography location information included in the supplementary information attached to the image data set which was obtained immediately before obtainment of the processing object image data set, wherein if the further judgment is YES, the intention judgment circuit judges that the image processing mode of the processing object image data set has been intentionally set.

20. The image processing apparatus according to claim 19, wherein the image processing mode is at least one of an automatic white balance adjustment processing mode, and a white balance adjustment processing mode according to a light source type.

21. An image processing apparatus according to claim 19, wherein if the judgment by the intention judgment circuit is YES, the control circuit controls the processing circuit so that the processing circuit performs the further image processing on the processing object image data set by canceling or reducing a processing amount of image processing according to the image processing mode in the further image processing.

22. An image processing apparatus according to claim 19, wherein the processing object image data set and the at least one of the image data sets exist in memory simultaneously, and the supplementary information of the processing object image data set is attached as a first tag to the processing object image data set, and the supplementary information of the at least one of the image data sets obtained before or after the photography time of the processing object image data set is attached as a second tag to the at least one of the image data sets.

23. An image processing apparatus comprising:

a processing circuit which obtains a processed image data set by performing further image processing on an image data set, on which image processing has been performed according to an image processing mode set at a photography device and to which supplementary information including image processing information indicating the image processing mode has been attached;

an intention judgment circuit which judges whether an image processing mode of the image data set has been intentionally set, based on supplementary information of the image data set and supplementary information attached to at least one of image data sets, which were obtained before or after photography time of the image data set, wherein the at least one of the image data sets includes an image data set obtained immediately before obtainment of the image data set;

an undoing circuit for undoing the image processing which has been performed on the image data set if the judgment by the intention judgment circuit is NO; and a control circuit which controls the processing circuit so that the processing circuit performs the further image processing on the image data set, of which the image processing has been undone by the undoing circuit, to obtain the processed image data set, wherein the intention judgment circuit judges whether the image processing mode of the processing object image data set and an image processing mode of the image data set obtained immediately before obtainment of the processing object image data set are the same, wherein if the judgment is YES, the intention judgment circuit obtains a frequency of photography during obtainment of the processing object image data set and a time interval between photography of the image data set obtained immediately before obtainment of the processing object image data set and photography of the processing object image data set based on photography date/time information included in the supplementary information attached to the processing object image data set and photography date/time information included in the supplementary information attached to the at least one of image data sets and further judges whether a relationship between the frequency of photography and the time interval of photography satisfies a predetermined relationship, wherein if the further judgment is YES, the intention judgment circuit judges that the image processing mode of the processing object image data set has been intentionally set.

* * * * *